United States Patent
Johnson et al.

(10) Patent No.: US 11,745,646 B1
(45) Date of Patent: Sep. 5, 2023

(54) VEHICLE ROOF LIGHT ASSEMBLY AND LIGHTING METHOD

(71) Applicant: Ford Global Technologies, LLC, Dearborn, MI (US)

(72) Inventors: Aaron Bradley Johnson, Allen Park, MI (US); Luciano Lukacs, Plymouth, MI (US); Michael L. Merritt, Farmington, MI (US); Joshua D. Schwab, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/948,432

(22) Filed: Sep. 20, 2022

(51) Int. Cl.
*B60Q 1/26* (2006.01)
*B60Q 1/32* (2006.01)

(52) U.S. Cl.
CPC .............. *B60Q 1/2611* (2013.01); *B60Q 1/32* (2013.01)

(58) Field of Classification Search
CPC ................................ B60Q 1/2611; B60Q 1/32
USPC .......................................................... 362/493
See application file for complete search history.

(56) References Cited

U.S. PATENT DOCUMENTS

| | | | |
|---|---|---|---|
| 7,237,932 B2 * | 7/2007 | Ter-Hovhannissian ..................... | B60Q 1/32 362/487 |
| 7,635,209 B2 | 12/2009 | Uematsu et al. | |
| 9,682,647 B2 | 6/2017 | Godbillon | |
| 10,266,100 B2 | 4/2019 | Reuschel et al. | |
| 10,308,168 B2 | 6/2019 | Salter et al. | |
| 11,002,422 B1 | 5/2021 | Johnson et al. | |
| 2004/0252021 A1 * | 12/2004 | Frank ................... | B60Q 1/2611 340/472 |
| 2012/0031939 A1 * | 2/2012 | Jutila ........................ | B60R 9/04 224/326 |
| 2015/0203026 A1 | 7/2015 | Schotanus | |
| 2015/0232019 A1 * | 8/2015 | Salter ................... | B60Q 1/2611 362/510 |

\* cited by examiner

*Primary Examiner* — Laura K Tso
(74) *Attorney, Agent, or Firm* — Vichit Chea; Carlson, Gaskey & Olds, P.C.

(57) ABSTRACT

An assembly includes a roof of a vehicle, and a light assembly that emits light outward from a passenger side, a driver side, and a forward side of the vehicle. The light assembly is vertically beneath the roof. A method includes providing a light assembly that extends along a passenger side, along a driver side, and along a forward side of a vehicle. The light assembly is between a roof of the vehicle and side doors of the vehicle. The method further includes selectively activating the light assembly to emit light outward from the vehicle.

15 Claims, 4 Drawing Sheets

VEHICLE ROOF LIGHT ASSEMBLY AND LIGHTING METHOD

TECHNICAL FIELD

This disclosure relates generally to a light assembly associated with a roof of vehicle.

BACKGROUND

Motor vehicles are known to include exterior lighting systems including a number of lighting and indicating devices.

SUMMARY

In some aspects, the techniques described herein relate to an assembly, including: a roof of a vehicle; a light assembly that emits light outward from a passenger side, a driver side, and a forward side of the vehicle, the light assembly vertically beneath the roof.

In some aspects, the techniques described herein relate to an assembly, wherein the light assembly is vertically above driver side doors and passenger side doors of the vehicle.

In some aspects, the techniques described herein relate to an assembly, wherein the light assembly is vertically above a windshield of the vehicle.

In some aspects, the techniques described herein relate to an assembly, wherein the light assembly extends forward from a position aft a driver side door to a forwardmost driver side pillar, and extends forward from a position aft a passenger side door to a forwardmost passenger side pillar.

In some aspects, the techniques described herein relate to an assembly, wherein the light assembly extends in a cross-vehicle direction from the forwardmost driver side pillar to the forwardmost passenger side pillar.

In some aspects, the techniques described herein relate to an assembly, wherein the driver side door is a driver side rear door, and the passenger side door is a passenger side rear door.

In some aspects, the techniques described herein relate to an assembly, wherein the light assembly includes a U-shaped lens that extends uninterrupted by any structure from the position after the driver side door to the position aft the passenger door.

In some aspects, the techniques described herein relate to an assembly, wherein the light assembly includes a housing and a light source, the lens received within an upper channel and a lower channel of the housing, the upper channel vertically above the light source, the lower channel vertically beneath the light source.

In some aspects, the techniques described herein relate to an assembly, wherein the lens is adhesively secured within the upper channel and the lower channel.

In some aspects, the techniques described herein relate to an assembly, wherein the upper channel and the lower channel each extend continuously from the position aft the driver side door to the position aft a passenger side door.

In some aspects, the techniques described herein relate to an assembly, further including a plurality of mechanical fasteners that extend through a perimeter flange of the roof and are received within the housing to secure the light assembly to the roof.

In some aspects, the techniques described herein relate to a method, including: providing a light assembly that extends along a passenger side, along a driver side, and along a forward side of a vehicle, the light assembly between a roof of the vehicle and side doors of the vehicle; and selectively activating the light assembly to emit light outward from the vehicle.

In some aspects, the techniques described herein relate to a method, further including selectively activating a selected portion of the light assembly to emit light outward from the passenger side or the driver side, the emitted light providing a supplemental turn indicator.

In some aspects, the techniques described herein relate to a method, further including selectively activated the light assembly to provide a visual charge indicator.

In some aspects, the techniques described herein relate to a method, wherein the light assembly extends aft past a passenger side door of the vehicle and aft past a driver side door of the vehicle.

In some aspects, the techniques described herein relate to a method, wherein the light assembly is U-shaped.

In some aspects, the techniques described herein relate to a method, wherein the light assembly is vertically above a windshield of the vehicle.

In some aspects, the techniques described herein relate to a method, wherein the light assembly is secured to a perimeter flange of the roof.

In some aspects, the techniques described herein relate to a method, wherein the light assembly is configured to emit a visually unbroken band of light that extends along a passenger side, along a driver side, and along a forward side of the roof.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
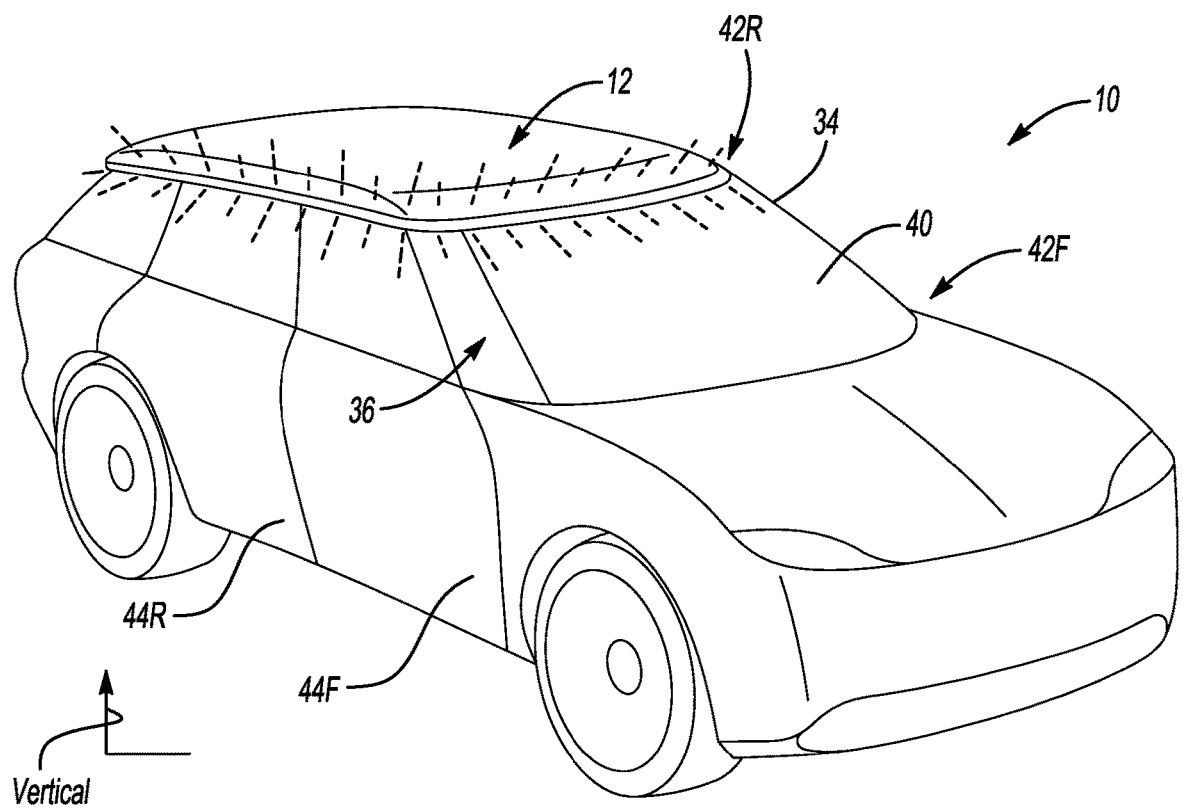
FIG. 1 illustrates a perspective view of an example vehicle having a light assembly at a perimeter of a roof.
Figure 2:
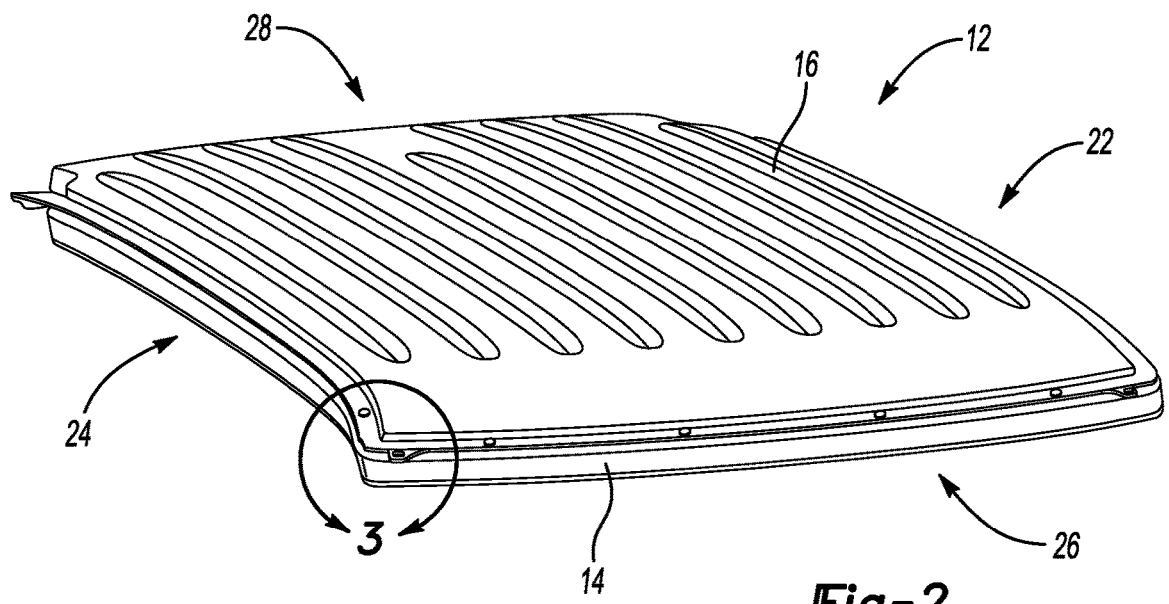
FIG. 2 illustrates a perspective view of the light assembly and the roof of FIG. 1.
Figure 3:
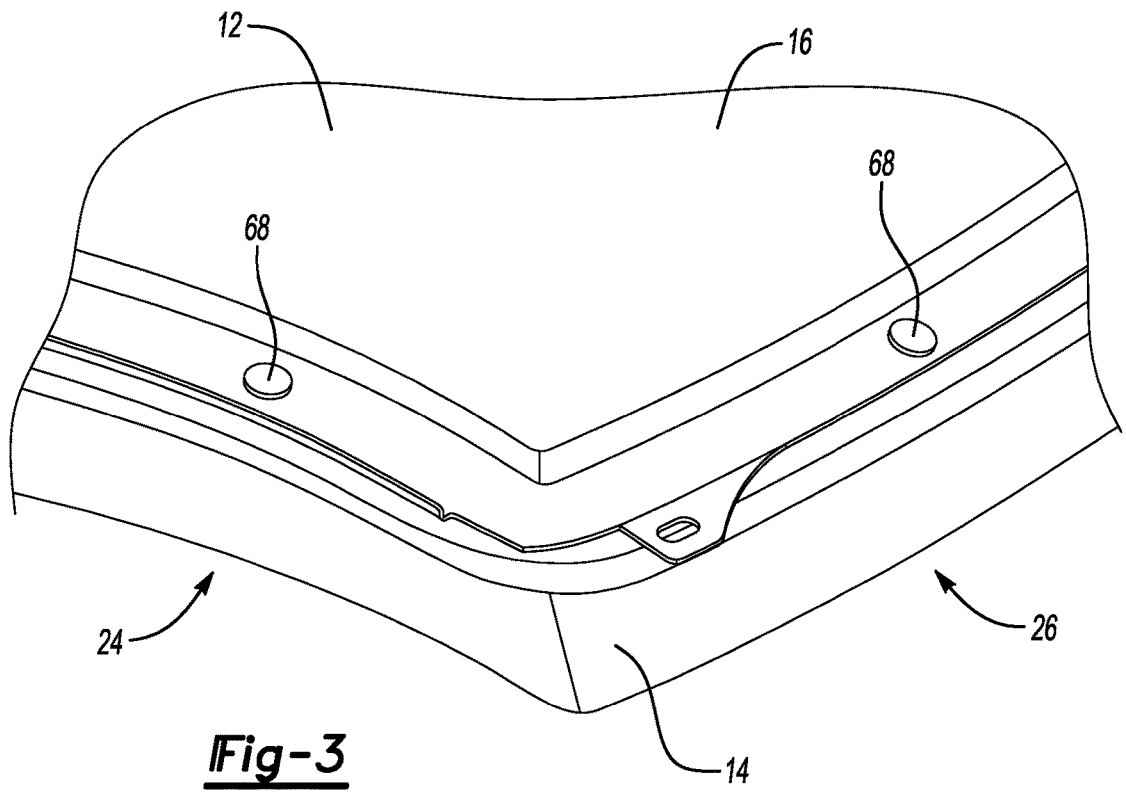
FIG. 3 illustrates a close-up view of an area of the light assembly and the roof of FIG. 2.
Figure 4:
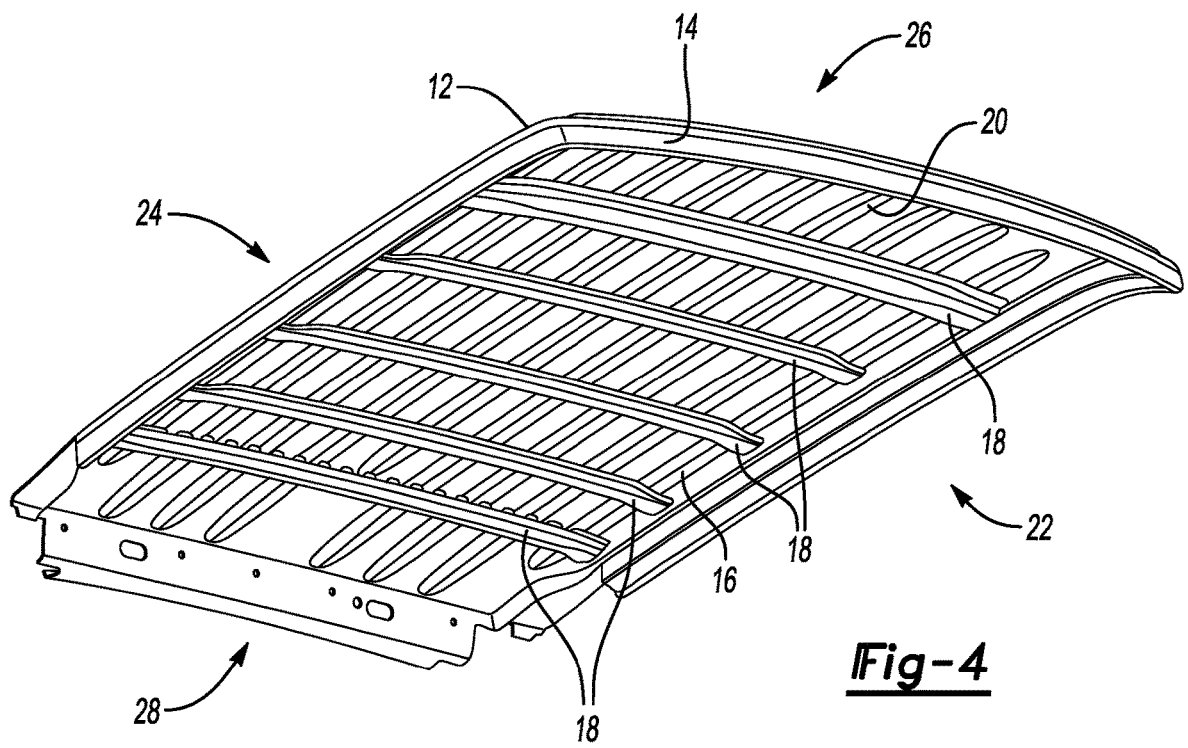
FIG. 4 illustrates an underneath view of the light assembly and roof of FIG. 2.

This disclosure details a light assembly for a motor vehicle. The light assembly is disposed about a roof of the vehicle. The light assembly is not only aesthetically pleasing but also enhances a user's personal connection with their vehicle. The light assembly can indicate various types of information to those near the motor vehicle, such as providing a supplemental turn indicator or indicating a state of charge (SOC) of a battery pack of the vehicle. The light assembly is also useable alone or in combination with other light assemblies of the vehicle to provide various indicators and other useful functions.

With reference to FIGS. 1-4, a vehicle 10 includes a roof 12 and a light assembly 14. The roof 12 includes a panel portion 16, and a plurality of supportive cross-members 18 along an underside 20 of the panel portion 16. The panel portion 16 can include multiple individual panels that are secured together. The roof 12 has a driver side 22, a passenger side 24, a front side 26, and an aft side 28.

The vehicle 10, in this example, is an electrified vehicle. Specifically, the vehicle 10 can be a battery electric vehicle (BEV) or a plug-in hybrid electric vehicle (PHEV), and includes a battery pack. The battery pack may be a high voltage traction battery pack that includes a plurality of battery assemblies (i.e., battery arrays or groupings of battery cells) capable of outputting electrical power to operate an electric machine, and in turn to propel the vehicle 10, and/or other electrical loads of the vehicle 10. Other types of energy storage devices and/or output devices can also be used to electrically power the vehicle 10. This disclosure is not limited to electrified vehicles.

The light assembly 14 is vertically beneath the roof 12. Vertical, for purposes of this disclosure is with reference to ground and a general orientation of the vehicle 10 during operation. In this example, the light assembly 14 is vertically beneath the roof 12 along the driver side 22 of the roof 12, along the passenger side 24 of the roof 12, and along the front side 26 of the roof 12.

The vehicle 10 further includes a forwardmost driver side pillar 34, a forwardmost passenger side pillar 36, a windshield 40, a front driver side door 42F, a rear driver side doors 42R, a front passenger side door 44F, and a rear passenger side door 44R.

The light assembly 14 is vertically above the windshield 40, the front and rear driver side doors 42F and 42R, and the front and rear passenger side doors 44F and 44R. The light assembly 14 is vertically beneath the roof 12. The light assembly 14 can be activated to emit light outward from beneath the driver side 22, the passenger side 24, and the front side 26 of the roof 12.

In the exemplary embodiment, the light assembly 14 is U-shaped. The light assembly 14 extends forward from a position aft the rear driver side door 42R to a forwardmost driver side pillar 34 of the vehicle 10, and extends forward from a position aft the rear passenger side door 44R to a forwardmost passenger side pillar 36. The light assembly 14 extends in a cross-vehicle direction from the forwardmost driver side pillar 34 to the forwardmost passenger side pillar 36.

The light assembly 14 can be activated to emit a substantially unbroken band of light that extends from the position aft the rear driver side door 42R, wraps around the front side 26 of the roof 12 to a position aft the rear passenger side door 44R.

Figure 5:
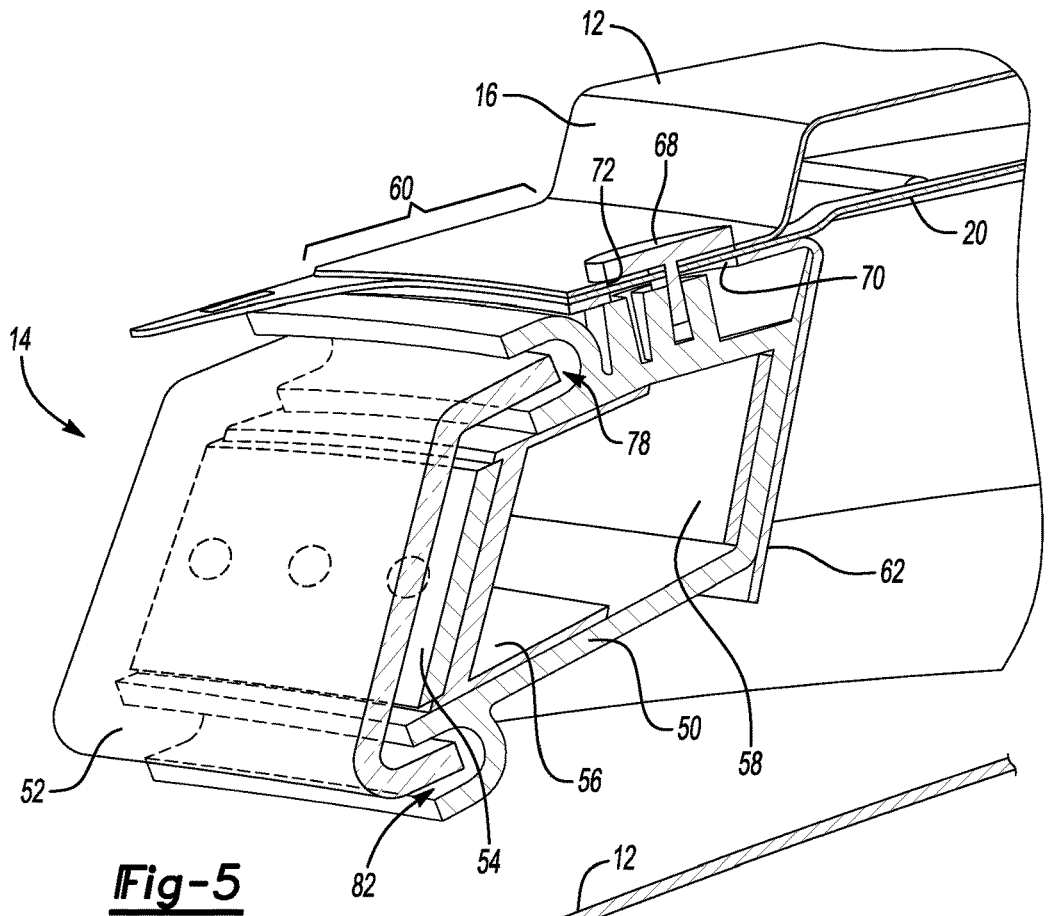
FIG. 5 illustrates a section view at line 5-5 in FIG. 2.
Figure 6:
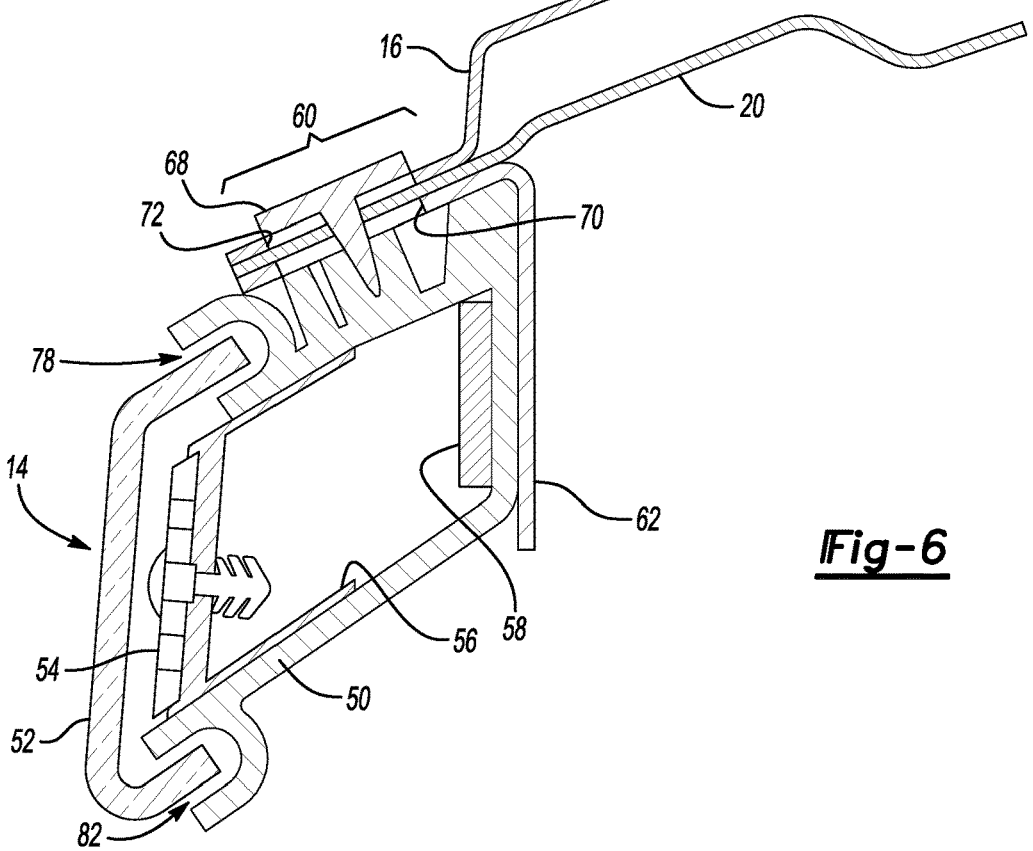
FIG. 6 illustrates a perspective view of the section in FIG. 5.

With reference now to FIGS. 5 and 6 and continuing reference to FIGS. 1-4, the example light assembly 14 includes a housing 50, a lens 52, a light source 54, a carrier 56, and a printed circuit board 58. The light assembly 14 mounts to a perimeter flange 60 of the panel portion 16 of the roof 12. The light assembly 14 additionally mounts to a U-shaped bracket 62 that is secured to the underside 20 of the panel portion 16. A plurality of mechanical fasteners 68 extend through a respective aperture 70 in the bracket 62 and through apertures 72 in the perimeter flange 60 and are received within the housing 50 to secure the light assembly 14 to the roof 12. The perimeter flange 60 can help to protect the light assembly 14 from environmental elements.

The housing 50 is also U-shaped. The housing 50 includes an upper channel 78 and a lower channel 82. When the light assembly 14 is assembled, the upper channel 78 is vertically above the light source 54, and the lower channel 82 is vertically beneath the light source 54. The upper channel 78 and the lower channel 82 each extend continuously from the position aft the rear driver side door 42R to the position aft the rear passenger side door 44R.

The lens 52 is partially received within the upper channel 78 and the lower channel 82 of the housing 50. Adhesive can be used to secure the lens 52 within the upper channel 78 and the lower channel 82 to secure the lens 52 relative to the housing 50. The lens 52 is U-shaped. When assembled, the lens 52 extends uninterrupted by any structure from the position aft the rear driver side door 42R to the position aft the rear passenger side door 44R.

The light source 54 can be provided by one or more flexible strips of light emitting diodes, such as strips of micro light emitting diodes. The strips are held by the carrier 56 in this example.

The light source 54 can be selectively activated by through the printed circuit board 58. The light source 54 can be selectively activated to emit a visually unbroken band of light that extends along the passenger side 24, along the front side 26, and along the driver side 22 of the roof 12.

In some examples, the light assembly 14 can include a long persistent phosphor film applied to, for example, a CLASS B side of the lens 52. The film continues to glow after the light source 54 is turned off. The glowing of the film allows the light assembly 14 to emit light even when light source 54 is turned off. The film can be excited by an ultraviolet light emitting diode light strip incorporated in the light assembly 14, for example.

Figure 7:
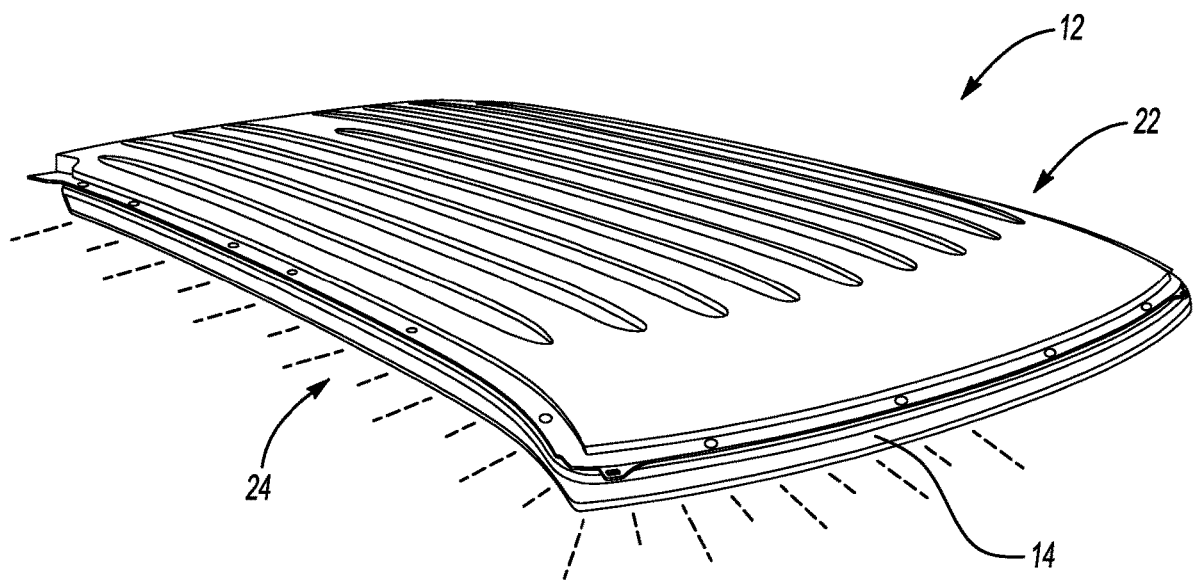
FIG. 7 illustrates a perspective view of the light assembly and roof of FIG. 2 when providing a supplemental turn indicator.

In an example, a selected portion of the light assembly 14 could be activated. For example, with reference to FIG. 7, a passenger side of the light assembly 14 could be selectively illuminated to emit light outward from a passenger side of the light assembly 14 to provide a supplemental turn indicator.

In an example, and intensity, illumination pattern, or color of the emitted light could be controlled to convey certain information. Operating the light assembly 14 to blink could provide an indicator that a traction battery of the vehicle 10 is being charged or of a state of charge of the traction battery, for example. In particular, the light assembly 14 can blink an emit a green color when the vehicle 10 is charging at a charging station and then stay on once the vehicle 10 is fully charged. When vehicle 10 is fully charged a message can be sent to a smartphone of the user.

A user of the vehicle 10 could, in some examples, choose a color for light emitted from the light assembly 14. The user could make the selection using a dialog screen within an instrument panel of the vehicle or on a smartphone.

The light assembly 14 can emit light in a plurality of different patterns (i.e., pulsing, chasing, intensifying, fading, etc.). For example, as a user of the vehicle 10 approaches the vehicle 10, the light assembly 14 could emit light that gradually increases in intensity. The vehicle 10 could activate the light assembly 14 in response to recognizing the approaching user via a keyfob or some other recognizable device. As the vehicle 10 turns off, the emitted light could gradually fade. The fading may be based on a timing of a security provision of the vehicle 10.

In an example, when vehicle 10 enters a drive mode, the user can be presented with an option to turn off the light assembly 14. The light assembly 14 could instead be illuminated during a drive cycle to potentially meet requirements for daytime running lamps.

If the vehicle 10 is an autonomous vehicle, while vehicle 10 is in DRIVE and in an autonomous mode, the light assembly 14 can be illuminated white with lower intensity than that of a typical daylight running lamp, for example. Alternate colors as approved can be utilized and updated via over the air updates.

When other flashing lights of the vehicle 10 are activated, the light assembly 14 can blink yellow, for example. The user, in some examples, has option to change the yellow light to red. Intensity of the light can be increased on demand to increase visibility.

When a user locks the vehicle 10, the light assembly 14 can blink with a white light three times. On the third blink, the while light can fade to off until vehicle 10 identifies the user. The light assembly 14 can then illuminate in a color chosen by the user.

When a user remote starts the vehicle 10, the passenger and driver side doors can automatically lock. To provide an indicator of the remote start and locking, the light assembly 14 can blink and emit an amber light. On the third blink, the emitted light can fade to a white light if at night time. During daytime, the emitted light can fade off until welcome features start in response to the vehicle 10 recognizing the user approaching the vehicle 10. At that time, the light assembly 14 can be illuminated as part of a welcome feature.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. An assembly, comprising:
   a roof of a vehicle; and
   a light assembly that emits light outward from a passenger side, a driver side, and a forward side of the vehicle, the light assembly vertically beneath the roof,
   wherein the light assembly extends in a U-shape forward from a position aft a driver side door to a forwardmost driver side pillar, extends forward from a position aft a passenger side door to a forwardmost passenger side pillar, and extends along a front of the roof from the forwardmost driver side pillar to the forwardmost passenger side pillar, and,
   wherein the light assembly includes a U-shaped lens that extends uninterrupted by any structure in the U-shape from the position aft the driver side door, along the front of the roof, to the position aft the passenger door.

2. The assembly of claim 1, wherein the light assembly is vertically above driver side doors and passenger side doors of the vehicle.

3. The assembly of claim 1, wherein the light assembly is vertically above a windshield of the vehicle.

4. The assembly of claim 1, wherein the light assembly extends in a cross-vehicle direction from the forwardmost driver side pillar to the forwardmost passenger side pillar.

5. The assembly of claim 1, wherein the driver side door is a driver side rear door, and the passenger side door is a passenger side rear door.

6. The assembly of claim 1, wherein the light assembly includes a housing and a light source, the lens received within an upper channel and a lower channel of the housing, the upper channel vertically above the light source, the lower channel vertically beneath the light source.

7. The assembly of claim 6, wherein the lens is adhesively secured within the upper channel and the lower channel.

8. The assembly of claim 6, wherein the upper channel and the lower channel each extend continuously from the position aft the driver side door to the position aft a passenger side door.

9. The assembly of claim 6, further comprising a plurality of mechanical fasteners that extend through a perimeter flange of the roof and are received within the housing to secure the light assembly to the roof.

10. A method, comprising:
    providing a light assembly that extends along a passenger side, along a driver side, and along a forward side of a vehicle, the light assembly between a roof of the vehicle and side doors of the vehicle; and
    selectively activating the light assembly to emit light outward from the vehicle, wherein the light assembly is configured to emit a visually unbroken band of light that extends along a passenger side, along a driver side, and along a forward side of the roof,
    wherein the light assembly is U-shaped, wherein the light assembly extends forward from a position aft a driver side door to a forwardmost driver side pillar, extends forward from a position aft a passenger side door to a forwardmost passenger side pillar, and extends along a front of the roof from the forwardmost driver side pillar to the forwardmost passenger side pillar.

11. The method of claim 10, further comprising selectively activating a selected portion of the light assembly to emit light outward from the passenger side or the driver side, the emitted light providing a supplemental turn indicator.

12. The method of claim 10, further comprising selectively activating the light assembly to provide a visual charge indicator.

13. The method of claim 10, wherein the light assembly extends aft past a passenger side door of the vehicle and aft past a driver side door of the vehicle.

14. The method of claim 10, wherein the light assembly is vertically above a windshield of the vehicle.

15. The method of claim 10, wherein the light assembly is secured to a perimeter flange of the roof.

* * * * *